United States Patent
Li et al.

(10) Patent No.: US 9,547,098 B2
(45) Date of Patent: Jan. 17, 2017

(54) COMPRESSIONAL VELOCITY CORRECTION APPARATUS, METHODS, AND SYSTEMS

(75) Inventors: Shuling Li, Sugar Land, TX (US); Cary C Purdy, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 60 days.

(21) Appl. No.: 14/391,301

(22) PCT Filed: Apr. 9, 2012

(86) PCT No.: PCT/US2012/032697
§ 371 (c)(1),
(2), (4) Date: Oct. 8, 2014

(87) PCT Pub. No.: WO2013/154519
PCT Pub. Date: Oct. 17, 2013

(65) Prior Publication Data
US 2015/0096827 A1    Apr. 9, 2015

(51) Int. Cl.
*G01V 1/48* (2006.01)
*G01V 1/50* (2006.01)

(52) U.S. Cl.
CPC . *G01V 1/48* (2013.01); *G01V 1/50* (2013.01); *G01V 2210/1429* (2013.01); *G01V 2210/6222* (2013.01); *G01V 2210/6244* (2013.01)

(58) Field of Classification Search
CPC .... G01V 1/50; G01V 1/48; G01V 2210/6222; G01V 2210/6244; G01V 2210/1429
USPC ............................................ 181/102; 367/34
See application file for complete search history.

(56) References Cited

U.S. PATENT DOCUMENTS

| | | | |
|---|---|---|---|
| 4,548,071 A | 10/1985 | Habiger | |
| 4,649,526 A | 3/1987 | Winbow et al. | |
| 6,351,991 B1 | 3/2002 | Sinha | |
| 6,982,928 B2 | 1/2006 | Al-Ali | |
| 7,617,051 B2 | 11/2009 | Sayers et al. | |

FOREIGN PATENT DOCUMENTS

WO    WO-2013154519 A1    10/2013

OTHER PUBLICATIONS

"Argentina Application Serial No. 20130101149, Office Action mailed Jul. 30, 2015", English Translation), 1 pg.
"Argentina Application Serial No. 20130101149, Office Action mailed Sep. 30, 2015", (w/ English Translation), 4 pgs.

(Continued)

*Primary Examiner* — Daniel L Murphy

(57) ABSTRACT

In some embodiments, an apparatus and a system, as well as a method and an article, may operate to measure compressional wave velocities in a geological formation surrounding a first well, to provide measured compressional wave velocity data, and to subsequently determine corrected compressional wave velocities for the first well. These corrected compressional wave velocities for the first well may be determined using a combination of the measured compressional wave velocity data and corrected compressional wave velocity data associated with one or more second wells. Predicted pore pressure data for the first well may be subsequently generated, using the corrected compressional wave velocities for the first well. Additional apparatus, systems, and methods are described.

20 Claims, 7 Drawing Sheets

(56) References Cited

OTHER PUBLICATIONS

"Argentina Application Serial No. 20130101149, Response filed Sep. 8, 2015 to Office Action mailed Jul. 30, 2015", (w/ English Translation of Amended Claims), 43 pgs.

"Canadian Application Serial No. 2,868,799, Office Action mailed Jul. 31, 2015", 4 pgs.

"European Application Serial No. 12873932.3, Extended European Search Report mailed Nov. 6, 2015", 5 pgs.

Huffman, Alan R., "Chapter 19: The Future of Pressure Prediction Using Geophysical Methods", *AAPG Memoir*, vol. 76. (Dec. 31, 2002), 217-233.

Li, Shuling, et al., "Pore-pressure and wellbore-stability prediction to increase drilling efficiency", *Journal of Petroleum Technology*, (Feb. 2012), 98-101.

Australian Application Serial No. 2012376842, Response filed Feb. 19, 2015 to First Examiners Report mailed Dec. 12, 2014, 2 pgs.

"Australian Application Serial No. 2012378842, First Examiners Report mailed Dec. 12, 2014", 3 pgs.

"European Application Serial No. 12873932.3, Office Action mailed Jan. 5, 2015", 2 pgs.

"International Application Serial No. PCT/US2012/032697, Response filed Sep. 17, 2013 to Written Opinion mailed Jul. 16, 2012".

Zhang, Jincai, "Challenges and Surprises of Abnormal Pore Pressures in Shale Gas", SPE 145964, *SPE Annual Technical Conference and Exhibition*, Oct. 30-Nov. 2, Denver, Colorado, USA, (2011), 1-9.

"European Application Serial No. 12873932.3, Response filed Feb. 26, 2015 to Office Action mailed Jan. 5, 2015", 9 pgs.

"International Application Serial No. PCT/US2012/032697, International Preliminary Report on Patentability mailed Apr. 15, 2014", 6 pgs.

"International Application Serial No. PCT/US2012/032697, International Search Report mailed Jul. 16, 2012", 3 pgs.

"International Application Serial No. PCT/US2012/032697, Written Opinion mailed Jul. 16, 2012", 9 pgs.

Al-Dabagh, H., "PSDM Yields Accurate Pore Pressure Prediction", [online]. 2011. Exploration & Production Magazine. Retrieved from the Internet: <URL:http://www.epmag.com/Production-Drilling/PSDM-Yields-Accurate-Pore-Pressure-Prediction__83479# >, (Jun. 1, 2011), 6 pgs.

Barriol, Y., et al., "The Pressures of Drilling and Production", Oilfield Review, 17(3), (2005), 22-41.

Castagna, J. P., et al., "Relationships between compressional-wave and shear-wave velocities in clastic silicate rocks", Geophysics, 50(4), (Apr. 1985), 571-581.

Lucier, A. M., et al., "Evaluation of variable gas saturation on acoustic log data from the Haynesville shale gas play. NW Louisiana, USA", The Leading Edge, 30(3), (Mar. 2011), 300-311.

Mosher, D. C., et al., "3. Seismic Stratigraphy of the Ontong Java Plateau", Proceedings of the Ocean Drilling Program, Scientific Results, vol. 130, (1993), 33-49.

Zhang, J., et al., "Casing Ultradeep, Ultralong Salt Sections in Deep Water: A Case Study for Failure Diagnosis and Risk Mitigation in Record-Depth Well", SPE 114273, 2008 SPE Annual Technical Conference and Exhibition, (Denver, CO, Sep. 21-24, 2008), (2008), 1-24.

Zhang, J., et al., "Challenges and Surprises of Abnormal Pore Pressures in Shale Gas Formations", SPE 145964, SPE Annual Technical Conference and Exhibtion (ATCE 2012), (Denver, CO, Oct. 30-Nov. 2, 2011), (2011), 1 pg.

"Canadian Application Serial No. 2,868,799, Response filed Dec. 4, 2015 to Office Action mailed Jul. 31, 2015", 7 pgs.

COMPRESSIONAL VELOCITY CORRECTION APPARATUS, METHODS, AND SYSTEMS

CLAIM OF PRIORITY

This application is a U. S. National Stage Filing under 35 U.S.C. §371 of International Application PCT/US2012/032697, filed on 9 Apr. 2012, and published as WO 2013/154519 A1, which application and publication are hereby incorporated by reference herein in their entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole.

For example, compressional wave velocity measurements can be used to predict pore pressure in non-gas bearing formations, where the pore pressure can be used to determine various characteristics of the formation. However, the presence of gas and total organic carbon (TOC) in the formation can affect measurement accuracy. Pore pressure prediction in these circumstances (e.g., in shale gas formations) may be even more useful, because the pressure can increase from a relatively normal to abnormally high values over a comparatively short depth interval. Thus, pore pressure prediction in shale gas plays may offer even greater challenges than in other types of reservoirs.

DETAILED DESCRIPTION

Figure 1:
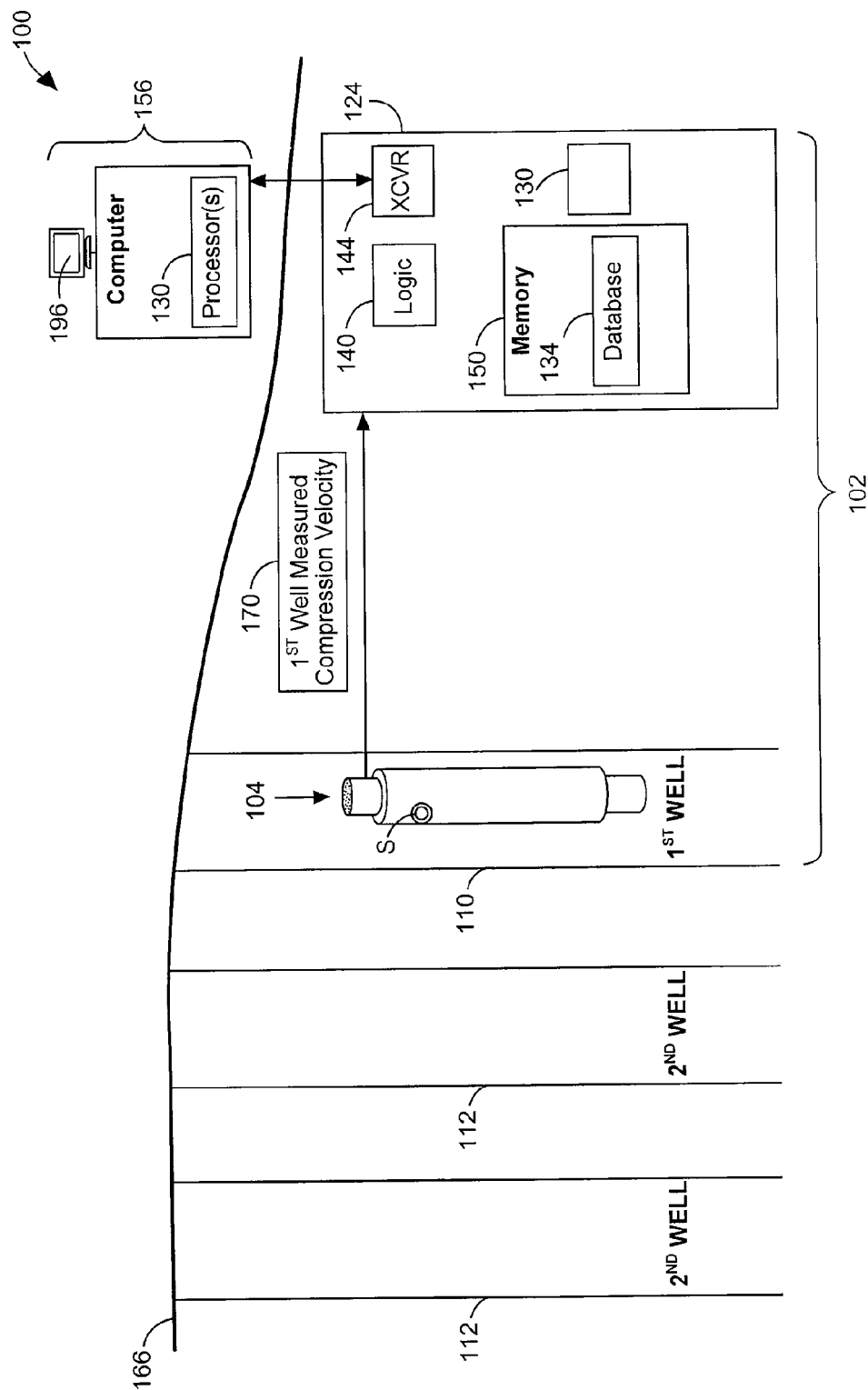
FIG. 1 is a block diagram of apparatus and systems according to various embodiments of the invention.

Since shear wave velocity measurement accuracy in a shale gas formation is often less affected than measurements of compressional wave velocity, shear wave velocity measurements can sometimes be used to correct directly corresponding compressional wave velocity measurement data. However, the use of this correction mechanism may not be practical in the oil and gas industry, because the measured shear wave velocity data that corresponds directly to measured compressional wave velocity data in most cases is not available. This is because the extra cost to measure shear wave velocity data in shale gas formations can be prohibitive.

To address some of these challenges, as well as others, apparatus, systems, and methods are described herein that provide corrected compressional velocity data to predict pore pressures, even when direct shear velocity wave measurements in a target well are not available. In many embodiments, corrected compressional velocity measurements in the target well can be derived from a statistical correlation between shear wave velocity and compressional wave velocity information that is obtained from offset wells. In this way, the accuracy of pore pressure prediction for a given target well (when no direct shear wave velocity measurement is available) may be significantly improved.

The statistical correlation of offset well data may be based on data obtained from shear wave and compressional wave offset well logs. Using acquired offset well shear wave velocity data, a formula (hereinafter the "Castagna formula") is used to determine corresponding corrected compressional wave data in the offset well. Thus, the Castagna formula uses only shear wave velocity data from the offset well to calculate a corresponding corrected compressional wave velocity data for the offset well.

The corrected compressional wave velocity data in the offset well is then compared to measured compressional wave velocity data in the offset well, over depth, to derive a correlation equation. This equation can be used to determine a corrected compressional wave velocity in a target (e.g., pre-drill) well when compressional wave velocities have been measured in the target well. Thus, corrected compressional wave velocities in the target well may be obtained even when no measured shear wave velocity data exists for the well.

To provide a more consistent use of terminology throughout this document, several specific terms and phrases are used. They are defined as follows:

compressional wave velocities=velocities of compressional waves in a first (e.g., target) well.

measured compressional wave velocity data=a set of compressional wave velocities measured in the first well.

corrected compressional wave velocities (for the first well)=corrected versions of the measured compressional wave velocity data in the first well.

corrected compressional wave velocity data (for a second (e.g., offset) well)=a set of corrected compressional wave velocities for the second well, derived from original shear wave velocity data values in the second well.

original compressional wave velocity data=a set of compressional wave velocities measured in the second well, to be correlated with the corrected compressional wave velocity data for the second well.

original shear wave velocity data=a set of shear wave velocities measured in the second well.

Similarly, in the interest of consistency, several variables are used throughout this document. They are defined as follows:

DTC original=measured compressional wave velocity data in μsec/ft

DTS original=measured shear wave velocity data in μsec/ft

DTCc=corrected compressional wave velocity data in μsec/ft

Vp=1/DTC original
Vs=1/DTS original
DeltaTs=DTS original
DeltaTp=DTC original
DeltaTpc=DTCc
Vpc=1/DTCc PP dt Miller=pore pressure predicted with the Miller method, using measured (uncorrected) compressional wave velocity data; those of ordinary skill in the art are familiar with how to predict pore pressure using this method. Others that desire to learn more about using the Miller method are encouraged to consult the article "Casing Ultradeep, Ultralong Salt Sections in Deep Water: A Case Study for Failure Diagnosis and Risk Mitigation in Record-Depth Well", Jincai Zhang, et al., SPE Annual Technical Conference and Exhibition, Denver, Colo., 2008; which is incorporated herein by reference in its entirety.

PP dt Miller DT corrected=pore pressure predicted with the Miller method, using corrected compressional wave velocity data A more detailed description of the mechanism used in some embodiments will now be provided.

In one or more second (e.g., offset) wells, values for DTS original and DTC original are measured. The Castagna formula, well-known to those of ordinary skill in the art, is used to take measured shear wave velocity data (DTS original), to determine corrected compressional wave velocity data for the second well(s) (DTCc). Those that are interested in learning more about various uses for the Castagna formula may consult the article "Relationships Between Compressional-Wave and Shear-Wave Velocities in Clastic Silicate Rocks", J. P. Castagna et al. Geophysics, VOL. 50, NO. 4 (April 1985); P. 571-581.

One form of the Castagna formula that is used to calculate DTCc is shown as equation (1) below:

$$DTCc=1/(1.16/DTS+0.00446119)(DTCc \text{ and } DTS \text{ are in } \mu s/ft) \quad (1)$$

The corrected compressional wave velocity data from the second well(s) (i.e., DTCc), and measured compressional wave velocity data from the second well(s) (i.e., DTC original) are used to derive a correlation equation, perhaps using a cross-plot of DTCc and DTC. The correlation equation, which relates the corrected compressional wave velocity to the measured compressional wave velocity, both in the second well, may take the form of equation (2) below:

$$\text{corrected compressional wave velocity (second well)} \\ = \text{slope*measured compressional wave velocity} \\ \text{(second well)+intercept} \quad (2)$$

This equation can then be used with measured compressional wave velocity data in the first well (e.g., a target well), when measured shear wave velocity data is absent. Equation (2) may take a linear form, as shown, or an exponential one, in some embodiments. Those of ordinary skill in the art, after studying this disclosure, will realize that many forms of equation (2) may be used, depending on how well the data fits the form of the equation.

For example, if the correlation between the measured and corrected compressional wave velocity data in the second well appears to be a substantially linear one, as shown above, the measured compressional wave data from the first well can be substituted into the correlation equation (2) to calculate corrected compressional wave velocity data for the first well. This is shown in equation (3) below:

$$\text{corrected compressional wave velocity (first well)} \\ = \text{slope*measured compressional wave velocity} \\ \text{(first well)+intercept} \quad (3)$$

The corrected compressional wave data determined for the first well can then be used to calculate pore pressure (e.g., using the Miller Method), in the first well, as an improved estimate of the pressure (when compared to the use of uncorrected compressional wave velocity data). Various embodiments that include some or all of these features will now be described in detail.

FIG. 1 is a block diagram of apparatus 102 and systems 100 according to various embodiments of the invention. In some embodiments, a system 100 includes a housing 104. The housing 104 might take the form of a wireline tool body, or a down hole tool. Processor(s) 130 within the system 100 may be located at the surface 166, as part of a surface logging facility 156, or in a data acquisition system 124, which may be above or below the Earth's surface 166 (e.g., attached to the housing 104).

A system 100 may further comprise a data transceiver 144 (e.g., a telemetry transmitter and/or receiver) to transmit acquired data 170 (e.g., measured compressional wave velocity data) from sensors S to the surface logging facility 156. Logic 140 can be used to acquire the data as signals, according to the various methods described herein. Acquired data 170, as well as other data, can be stored in the memory 150, perhaps as part of a database 134.

In many embodiments, the data 170 corresponds solely to compressional wave velocities measured in the first well (e.g., target well) 110. That is, for most embodiments, it is assumed that measured values for shear wave velocities in the first well 110 are inaccessible, or otherwise unavailable.

Original compressional wave velocity data and original shear wave velocity data may be determined by making measurements in second wells (e.g., offset wells) 112, using sensors S, and then storing the data in the memory 150, or elsewhere, for later use.

Figure 2:
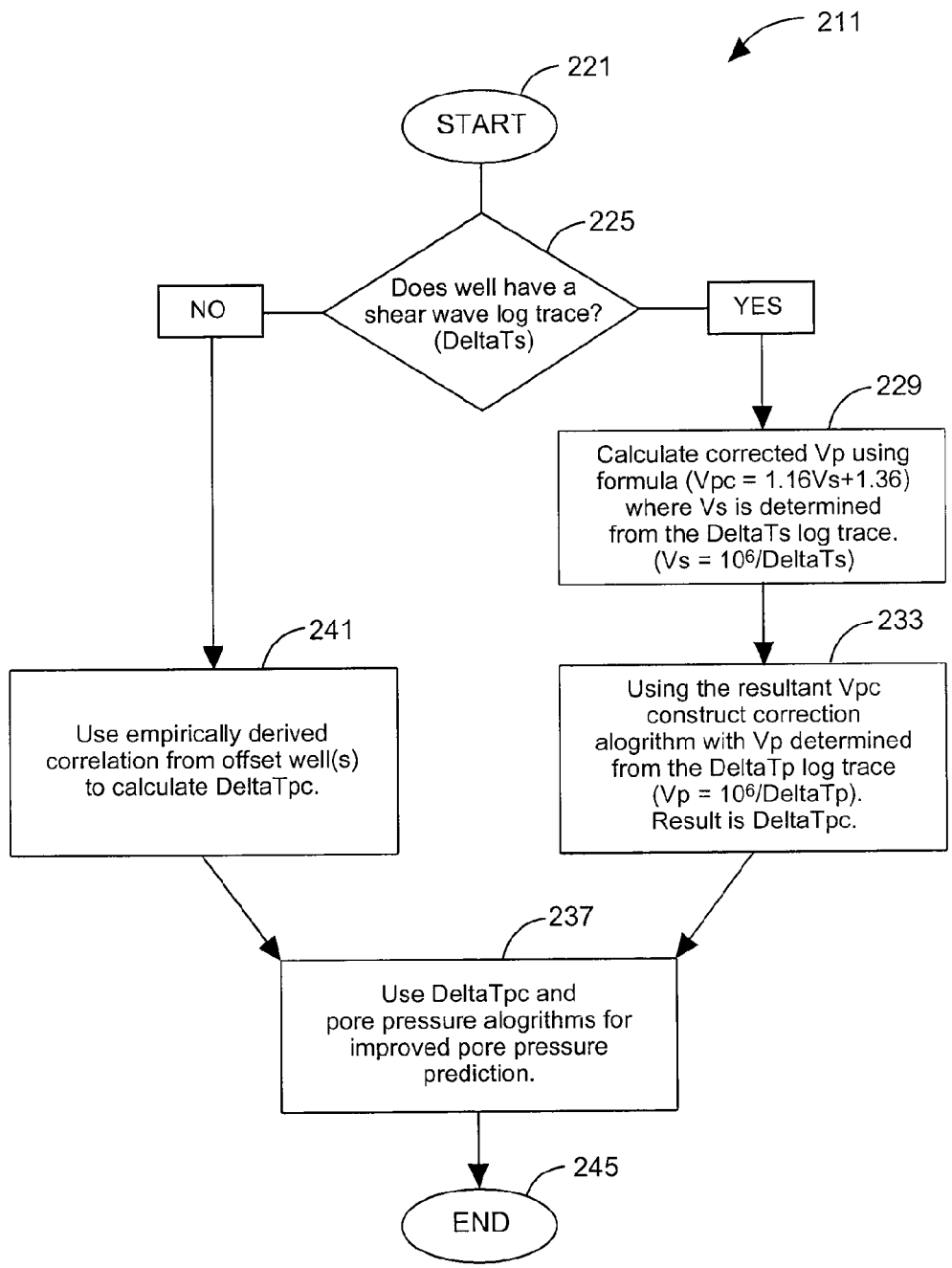
FIG. 2 is a flow chart illustrating several methods according to various embodiments of the invention.

FIG. 2 is a flow chart illustrating several methods 211 according to various embodiments of the invention. These methods 211 can be used to correct measured compressional wave velocity data in a target well. The methods 211 may be applied to a number of configurations of the system 100 shown in FIG. 1.

In some embodiments, a method 211 may begin at block 221, and continue on to block 225, to determine whether shear wave velocity measurements have been made in the target well, perhaps in the form of a shear wave log trace (e.g., a trace of DeltaTs). If so, then the method 211 may continue on to block 229 with calculating corrected values of Vp using the Castagna formula (i.e., Vpc in km/sec=1.16 Vs+1.36). In this case, Vs may be determined using a log trace of DeltaTs (since Vs in ft/sec=$10^6$/(DeltaTs in $\mu$s/ft)) from the target well.

The method 211 may continue on to block 233, to use the values of Vpc to construct a correction algorithm that provides DeltaTpc as the end result. Vp may be obtained using a log trace of DeltaTp from the target well (since Vp=1/DTC original, and DeltaTp=DTC original, which means that Vp in ft/sec=$10^6$/(DeltaTp in $\mu$s/ft)). As noted previously, DeltaTpc, the end result, can also be expressed as DTCc=1/Vpc.

At this point, the method 211 continues on to block 237, where DeltaTpc is used as the input to a pore pressure prediction algorithm (e.g., the Miller method, among others) to provide predicted pore pressure in the target well. The method 211 may then end at block 245.

In some embodiments, after the method 211 begins at block 221, the determination is made at block 225 that shear wave velocity measurements have not been made in the target well, or are otherwise not available. In this case, the method 211 may continue on to block 241, to empirically derive a correlation from offset well data, as described above. This correlation permits calculating DeltaTpc for the target well, even in the absence of measured shear wave velocity data for the target well.

For example, a spreadsheet table of measured shear wave velocity (DTS original) and measured compressional wave velocity (DTC original) in one or more offset wells may be constructed. Corrected compressional wave values (DTCc) for each offset well may be determined using the Castagna formula. A basic spreadsheet linear function may then be used to build a regression analysis for DTCc and DTC.

At this point, the average slope and intercept among the offset wells can be used to develop a linear equation (if that is the desired form of the correlation equation), as shown in equation (4) below:

$$DTCc = \text{Average\_Slope} * DTC + \text{Average\_Intercept} \quad (4)$$

For nearby target wells which don't have measured values of DTS original, but do have measured DTC original values, the DTC original values can be entered into equation (4) to calculate DTCc for each target well. These values of DTCc can be used to predict pore pressure for shale gas formations in the same region.

Thus, referring now to FIGS. 1-2, it can be seen that many embodiments may be realized, including a system 100 that comprises a housing 104 and one or more processors 130, which may be located down hole or at the surface. For example, in some embodiments a system 100 comprises a housing 104 to be operated in a first well 110 and a processor 130 to receive measured compressional wave velocity data 170 associated with the first well 130. The processor 130 may be configured to determine corrected compressional wave velocities for the first well 110 using a combination of the measured compressional wave velocity data 170 and corrected compressional wave velocity data associated with one or more second wells 112 different from the first well 110. The processor 130 may also be configured to generate predicted pore pressure data for the first well 110, using the corrected compressional wave velocities (for the first well 110).

An acoustic sensor (e.g., transducer) may be used to receive acoustic signals, after they have interacted with the formation surrounding the housing 104. Thus, the system 100 may comprise a sensor S, such as an acoustic sensor, attached to the housing 104. The sensor S can be used to receive acoustic signals associated with the measured compressional wave velocity data.

A telemetry transmitter can be used to transmit the measured acoustic data to the surface. Thus, the system 100 may comprise a transceiver 144, including a telemetry transmitter, attached to the housing. The telemetry transmitter may be used to communicate data associated with the acoustic signals as the measured compressional wave velocity data 170 to a surface data processing facility 156. The housing 104 may comprise a wireline tool or a down hole tool, such as a logging while drilling tool or a measurement while drilling tool, among others.

In the system 100, the processor 130 may be housed by the housing 104, or a surface data processing facility 156, or both, depending on where various calculations are to be made. Thus, processing during various activities conducted by the system 100 may be conducted both down hole and at the surface 166. In this case, the processor 130 may comprise multiple computational units, some located down hole, and some at the surface 166. Additional embodiments may be realized, and thus, some additional examples of systems will now be described.

Figure 3:
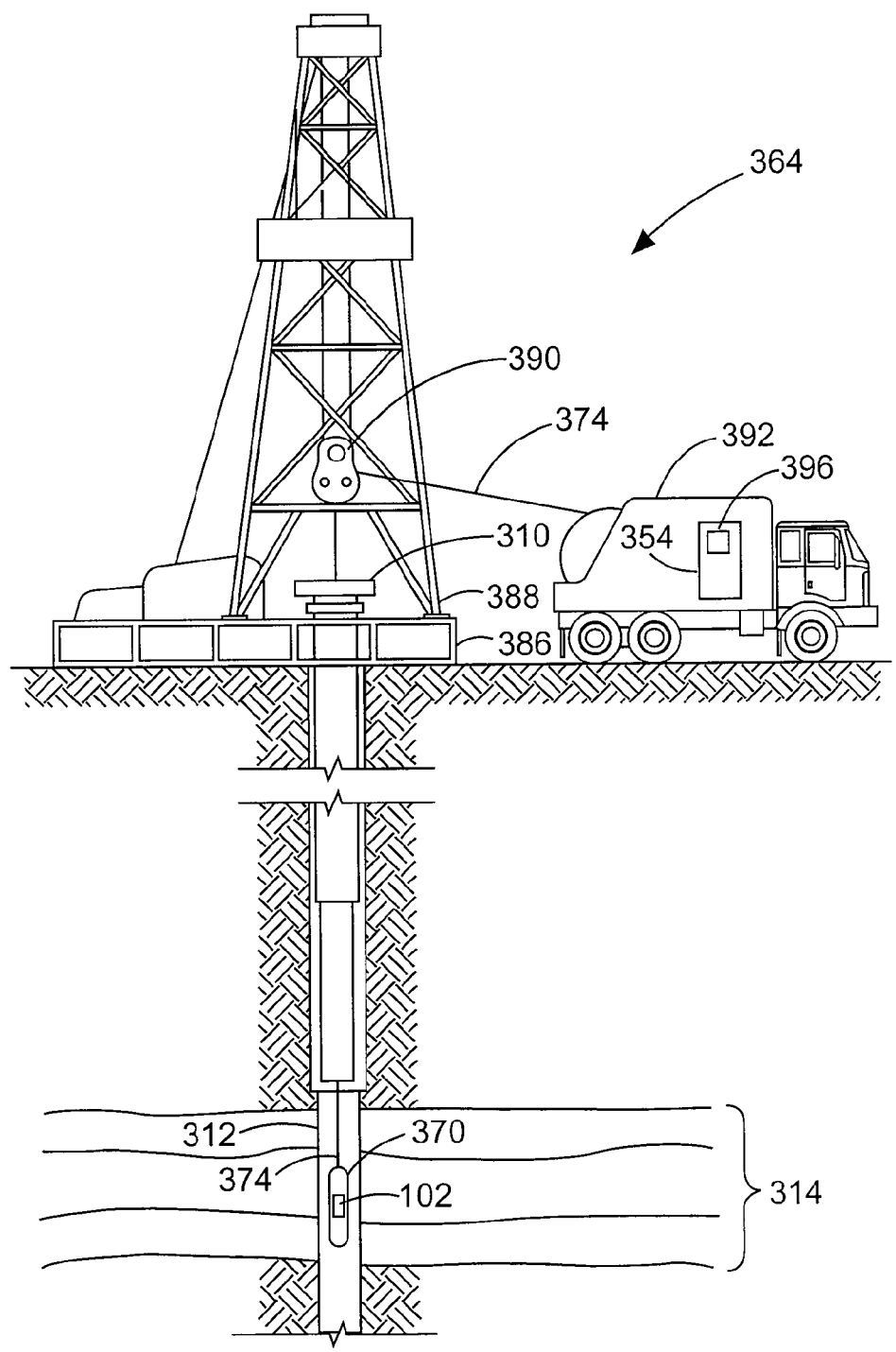
FIG. 3 illustrates a wireline system embodiment of the invention.
Figure 4:
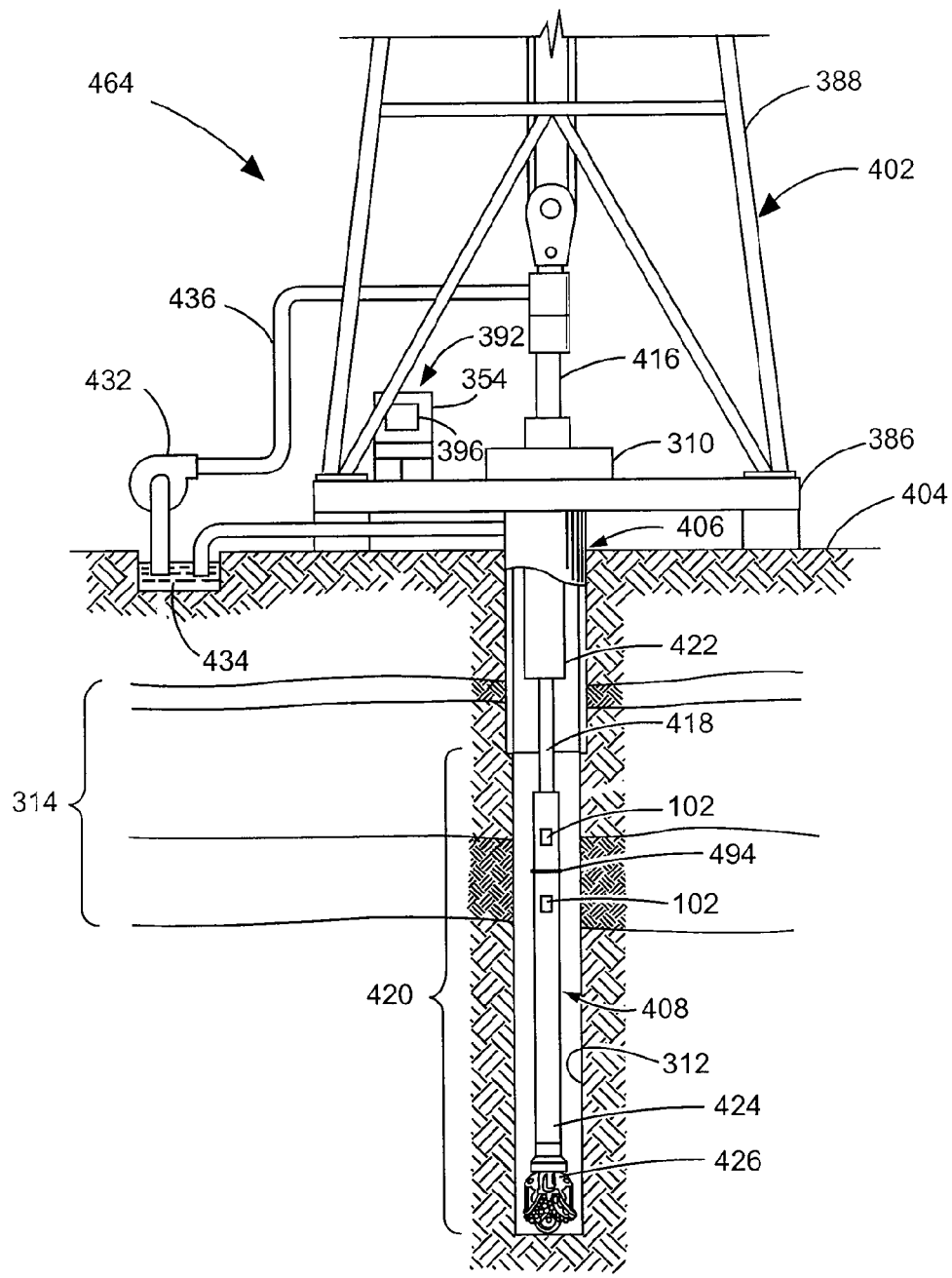
FIG. 4 illustrates a drilling rig system embodiment of the invention.

FIG. 3 illustrates a wireline system 364 embodiment of the invention, and FIG. 4 illustrates a drilling rig system 464 embodiment of the invention. Therefore, the systems 364, 464 may comprise portions of a wireline logging tool body 370 as part of a wireline logging operation, or of a down hole tool 424 as part of a down hole drilling operation. The systems 364 and 464 may comprise any one or more elements of the system 100 shown in FIG. 1.

Thus, FIG. 3 shows a well during wireline logging operations. In this case, a drilling platform 386 is equipped with a derrick 388 that supports a hoist 390.

Drilling oil and gas wells is commonly carried out using a string of drill pipes connected together so as to form a drilling string that is lowered through a rotary table 310 into a wellbore or borehole 312. Here it is assumed that the drilling string has been temporarily removed from the borehole 312 to allow a wireline logging tool body 370, such as a probe or sonde, to be lowered by wireline or logging cable 374 into the borehole 312. Typically, the wireline logging tool body 370 is lowered to the bottom of the region of interest and subsequently pulled upward at a substantially constant speed.

During the upward trip, at a series of depths, various instruments included in the tool body 370 may be used to perform measurements (e.g., made by portions of the apparatus 102 shown in FIG. 1) on the subsurface geological formations 314 adjacent the borehole 312 (and the tool body 370). The borehole 312 may represent one or more offset wells, or a target well.

The measurement data can be communicated to a surface logging facility 392 for processing, analysis, and/or storage. The logging facility 392 may be provided with electronic equipment for various types of signal processing, which may be implemented by any one or more of the components of the apparatus 102 or system 100 in FIG. 1. Similar formation evaluation data may be gathered and analyzed during drilling operations (e.g., during logging while drilling operations, and by extension, sampling while drilling).

In some embodiments, the tool body 370 is suspended in the wellbore by a wireline cable 374 that connects the tool to a surface control unit (e.g., comprising a workstation 354). The tool may be deployed in the borehole 312 on coiled tubing, jointed drill pipe, hard wired drill pipe, or any other suitable deployment technique.

Turning now to FIG. 4, it can be seen how a system 464 may also form a portion of a drilling rig 402 located at the surface 404 of a well 406. The drilling rig 402 may provide support for a drill string 408. The drill string 408 may operate to penetrate the rotary table 310 for drilling the borehole 312 through the subsurface formations 314. The drill string 408 may include a Kelly 416, drill pipe 418, and a bottom hole assembly 420, perhaps located at the lower portion of the drill pipe 418.

The bottom hole assembly 420 may include drill collars 422, a down hole tool 424, and a drill bit 426. The drill bit 426 may operate to create the borehole 312 by penetrating the surface 404 and the subsurface formations 314. The down hole tool 424 may comprise any of a number of different types of tools including measurement while drilling tools, logging while drilling tools, and others.

During drilling operations, the drill string 408 (perhaps including the Kelly 416, the drill pipe 418, and the bottom hole assembly 420) may be rotated by the rotary table 310. Although not shown, in addition to, or alternatively, the bottom hole assembly 420 may also be rotated by a motor (e.g., a mud motor) that is located down hole. The drill collars 422 may be used to add weight to the drill bit 426. The drill collars 422 may also operate to stiffen the bottom hole assembly 420, allowing the bottom hole assembly 420 to transfer the added weight to the drill bit 426, and in turn, to assist the drill bit 426 in penetrating the surface 404 and subsurface formations 314.

During drilling operations, a mud pump 432 may pump drilling fluid (sometimes known by those of ordinary skill in the art as "drilling mud") from a mud pit 434 through a hose 436 into the drill pipe 418 and down to the drill bit 426. The drilling fluid can flow out from the drill bit 426 and be returned to the surface 404 through an annular area between the drill pipe 418 and the sides of the borehole 312. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation cuttings created by operating the drill bit 426.

Thus, referring now to FIGS. 1 and 3-4, it may be seen that in some embodiments, the systems 364, 464 may include a drill collar 422, a down hole tool 424, and/or a wireline logging tool body 370 to house one or more apparatus 102, similar to or identical to the apparatus 102 described above and illustrated in FIG. 1. Any and all components of the system 100 in FIG. 1 may also be housed by the tool 424 or the tool body 370.

Thus, for the purposes of this document, the term "housing" may include any one or more of a drill collar 422, a down hole tool 424, or a wireline logging tool body 370 (all having an outer surface, to enclose or attach to magnetometers, sensors, fluid sampling devices, pressure measurement devices, temperature measurement devices, transmitters, receivers, acquisition and processing logic, and data acquisition systems). The tool 424 may comprise a down hole tool, such as an LWD tool or MWD tool. The wireline tool body 370 may comprise a wireline logging tool, including a probe or sonde, for example, coupled to a logging cable 374. Many embodiments may thus be realized.

For example, in some embodiments, a system 364, 464 may include a display 396 to present compressional wave velocity data in a target well, both measured and corrected, as well as database information (e.g., measured values of shear and compressional wave velocity data in offset wells), perhaps in graphic form. Predicted pore pressure information, using uncorrected and/or corrected compressional wave velocity data in the target well, may also be displayed.

The systems 100, 364, 464; apparatus 102; housing 104; data acquisition system 124; processors 130; database 134; logic 140; transceiver 144; memory 150; surface logging facility 156; surface 166; data 170; rotary table 310; borehole 312; computer workstations 354; wireline logging tool body 370; logging cable 374; drilling platform 386; derrick 388; hoist 390; logging facility 392; display 396; drill string 408; Kelly 416; drill pipe 418; bottom hole assembly 420; drill collars 422; down hole tool 424; drill bit 426; mud pump 432; mud pit 434; hose 436; and sensors S may all be characterized as "modules" herein.

Such modules may include hardware circuitry, and/or a processor and/or memory circuits, software program modules and objects, and/or firmware, and combinations thereof, as desired by the architect of the apparatus 102 and systems 100, 364, 464 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 102 and systems 100, 364, 464 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 5:
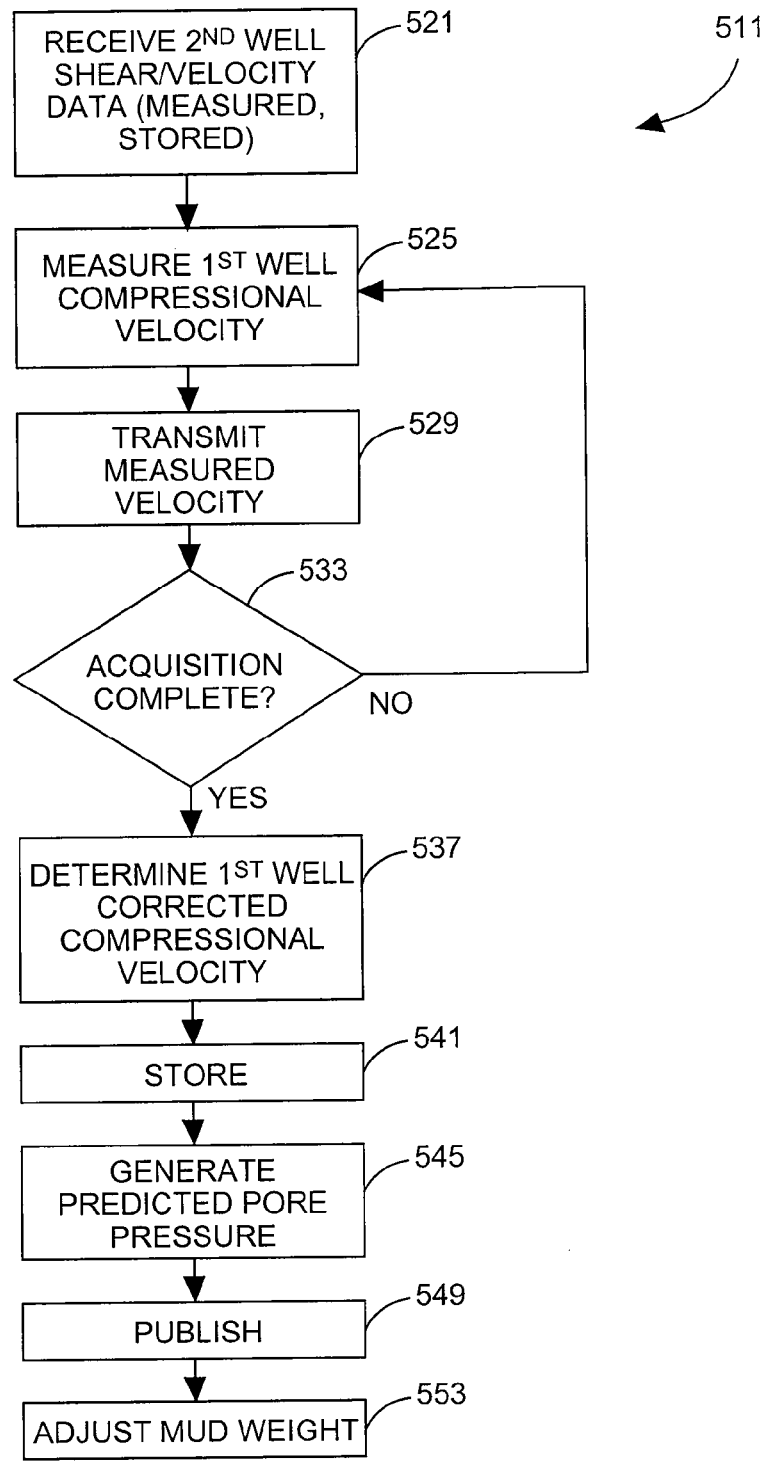
FIG. 5 is a flow chart illustrating several additional methods according to various embodiments of the invention.

For example, FIG. 5 is a flow chart illustrating several additional methods 511 according to various embodiments of the invention. The method 511 may comprise processor-implemented methods, to execute on one or more processors that perform the methods.

One embodiment of the methods 511 may begin at block 521 with acquiring original second well (e.g., offset well) data from a remote location. This data can be provided directly, via measurement, or indirectly, via storage. Thus, the activity at block 521 may comprise receiving original compressional wave velocity data and original shear wave velocity data associated with one or more second wells. The second wells may be located in the same shale base formation region as a first well (e.g., a target well) for which compressional wave velocity data will be corrected (when no measured shear wave velocity data for the first well is available).

The method 511 may continue on to block 525 with measuring compressional wave velocities in a geological formation surrounding the first well, to provide measured compressional wave velocity data. Acoustic signal data can be acquired to provide the measured compressional wave velocity data. Thus, the activity at block 525 may comprise receiving acoustic signals in the first well from the geological formation, and determining the measured compressional wave velocity data using the compressional wave velocities associated with the acoustic signals.

The measured compressional wave velocity data may be transmitted to the surface, perhaps for additional processing. Thus, the method 511 may continue on to block 529, to include transmitting the measured compressional wave velocity data to a surface computer in some embodiments.

The method 511 may continue on to block 533 to determine whether acquisition of the first well measurements is complete. If not, the method 511 may return to block 525 to acquire additional data. If so, then the method 511 may continue on to block 537.

At block 537, the method 511 may include determining corrected compressional wave velocities for the first well using a combination of the measured compressional wave velocity data and corrected compressional wave velocity data associated with one or more second wells different from the first well.

As noted previously, the original shear wave velocity data from the second well can be used to determine corrected compressional wave velocity data for the second well. Thus, the activity at block 537 may comprise determining the corrected compressional wave velocity data associated with the one or more second wells, using the original shear wave velocity data associated with those wells.

The corrected compressional wave velocity in the second well can be correlated with the original compressional wave velocity data, over depth, in the second well. Thus, the activity at block 537 may comprise correlating the corrected compressional wave velocity data associated with the one or more second wells with the original compressional wave velocity data (from the one or more second wells) over a depth domain, to provide a correlation.

As noted previously, an equation that defines a correction formula for the measured compressional wave velocity data in the first well can be developed, using the correlation between the original and corrected compressional wave data for the second well. The equation may take a linear form, an exponential form, or some other form. Thus, the activity at block 537 may comprise determining an equation defined by the correlation, the equation describing a relationship between the measured compressional wave velocity data for the first well, and the corrected compressional wave velocities for the first well.

The equation that defines a correction formula for the measured compressional wave velocity data in the first well can sometimes be improved by using a correlation relationship between the original (measured) compressional wave velocity data, and corrected compressional wave velocity data, for multiple second wells. For example, this relationship may comprise an averaged correlation. Thus, the activity at block 537 may comprise determining an average slope and an average intercept of a substantially linear relationship between the corrected compressional wave velocities of the first well and the measured compressional wave velocity data for the first well. The average slope and the average intercept may in turn be determined by a relationship between the original compressional wave velocity data and corrected compressional wave velocity data, based on the original shear wave velocity data, associated with multiple second wells.

The original, measured, and corrected data, including corrected compressional wave velocities, can be entered into a table. Thus, the method 511 may continue on to block 541 to include storing the corrected compressional wave velocities, among other data, in a table.

The method 511 may continue on to block 545 to include generating predicted pore pressure data for the first well, using the corrected compressional wave velocities.

The predicted pore pressure data can be "published", which for the purposes of this document means any one or more of: stored in a memory, shown on a display, or printed on paper. Thus, the method 511 may continue on to block 549 to include publishing the predicted pore pressure data on a display.

Other aspects of down hole operations that can be predicted from the predicted pore pressure data can also be published. Thus, for example, the activity at block 549 may include publishing predicted seal failure or well bore failure based on the predicted pore pressure Predicted pore pressure data can be used as the basis for adjusting the mud weight down hole, during drilling operations. Thus, in some embodiments, the method 511 may continue on to block 553 to include adjusting mud weight to balance pore pressure in the geological formation, based on the predicted pore pressure data.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 2 and 5) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 6:
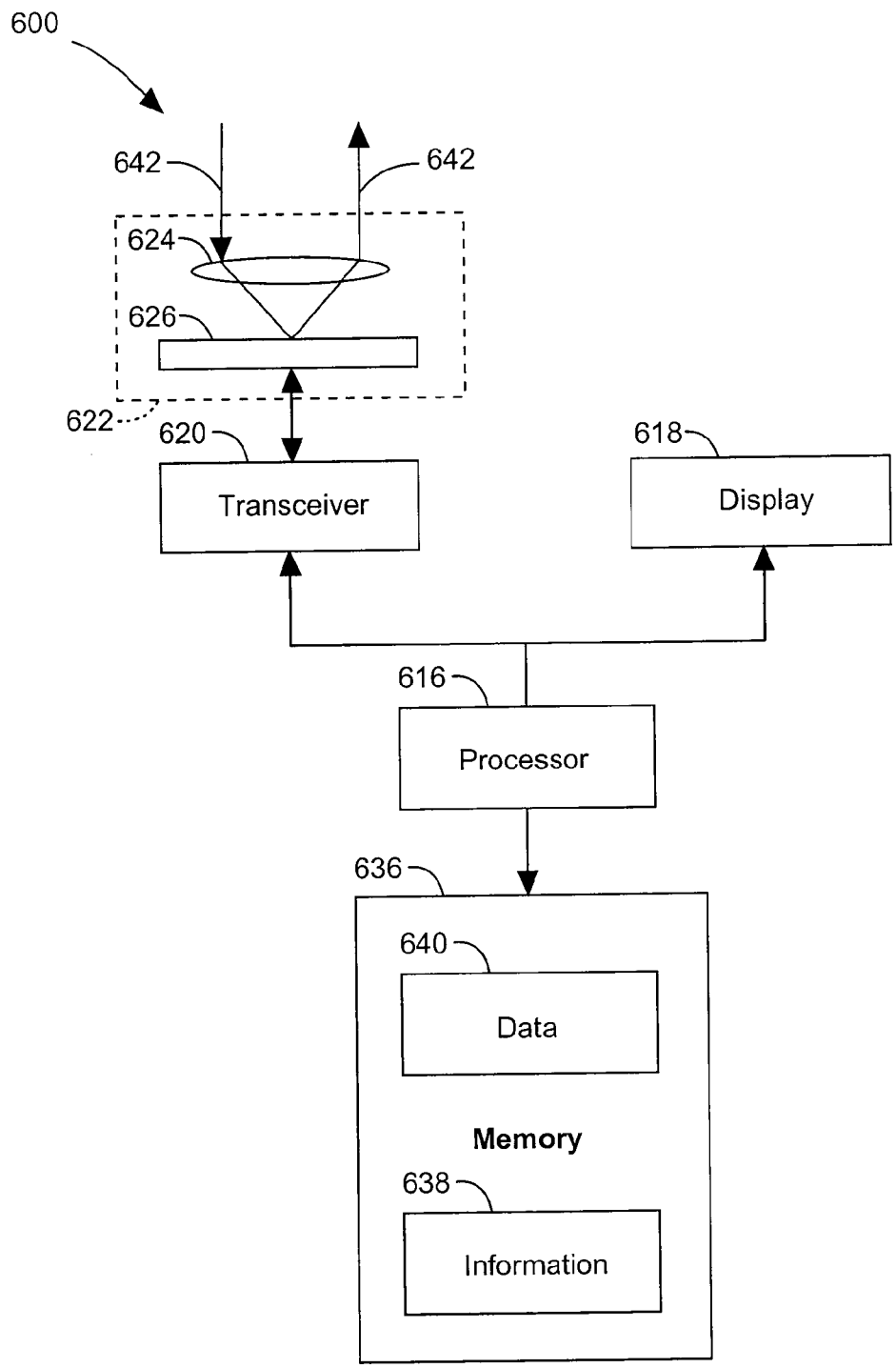
FIG. 6 is a block diagram of an article according to various embodiments of the invention.

For example, FIG. 6 is a block diagram of an article 600 of manufacture according to various embodiments, such as a computer, a memory system, a magnetic or optical disk, or some other storage device. The article 600 may include one or more processors 616 coupled to a machine-accessible medium such as a memory 636 (e.g., removable storage media, as well as any tangible, non-transitory memory including an electrical, optical, or electromagnetic conductor having associated information 638 (e.g., computer program instructions and/or data), which when executed by one or more of the processors 616, results in a machine (e.g., the article 600) performing any of the actions described with respect to the methods of FIGS. 2 and 5, and the systems of FIGS. 1, 3, and 4. The processors 616 may comprise one or more processors sold by Intel Corporation (e.g., Intel® Core™ processor family), Advanced Micro Devices (e.g., AMD Athlon™ processors), and other semiconductor manufacturers.

In some embodiments, the article 600 may comprise one or more processors 616 coupled to a display 618 to display data processed by the processor 616 and/or a wireless transceiver 620 (e.g., a down hole telemetry transceiver) to receive and transmit data processed by the processor.

The memory system(s) included in the article 600 may include memory 636 comprising volatile memory (e.g., dynamic random access memory) and/or non-volatile memory. The memory 636 may be used to store data 640 processed by the processor 616, including corrected compressional wave velocity data that is associated with a first (e.g., target) well, where no measured shear wave velocity data is available.

In various embodiments, the article 600 may comprise communication apparatus 622, which may in turn include amplifiers 626 (e.g., preamplifiers or power amplifiers) and one or more transducers 624 (e.g., transmitting and/or receiving devices, such as acoustic transducers). Signals 642 received or transmitted by the communication apparatus 622 may be processed according to the methods described herein.

Many variations of the article 600 are possible. For example, in various embodiments, the article 600 may comprise a down hole tool, including any one or more elements of the system 100 shown in FIG. 1. Some of the potential advantages of implementing the various embodiments described herein will now be described.

Figure 7:
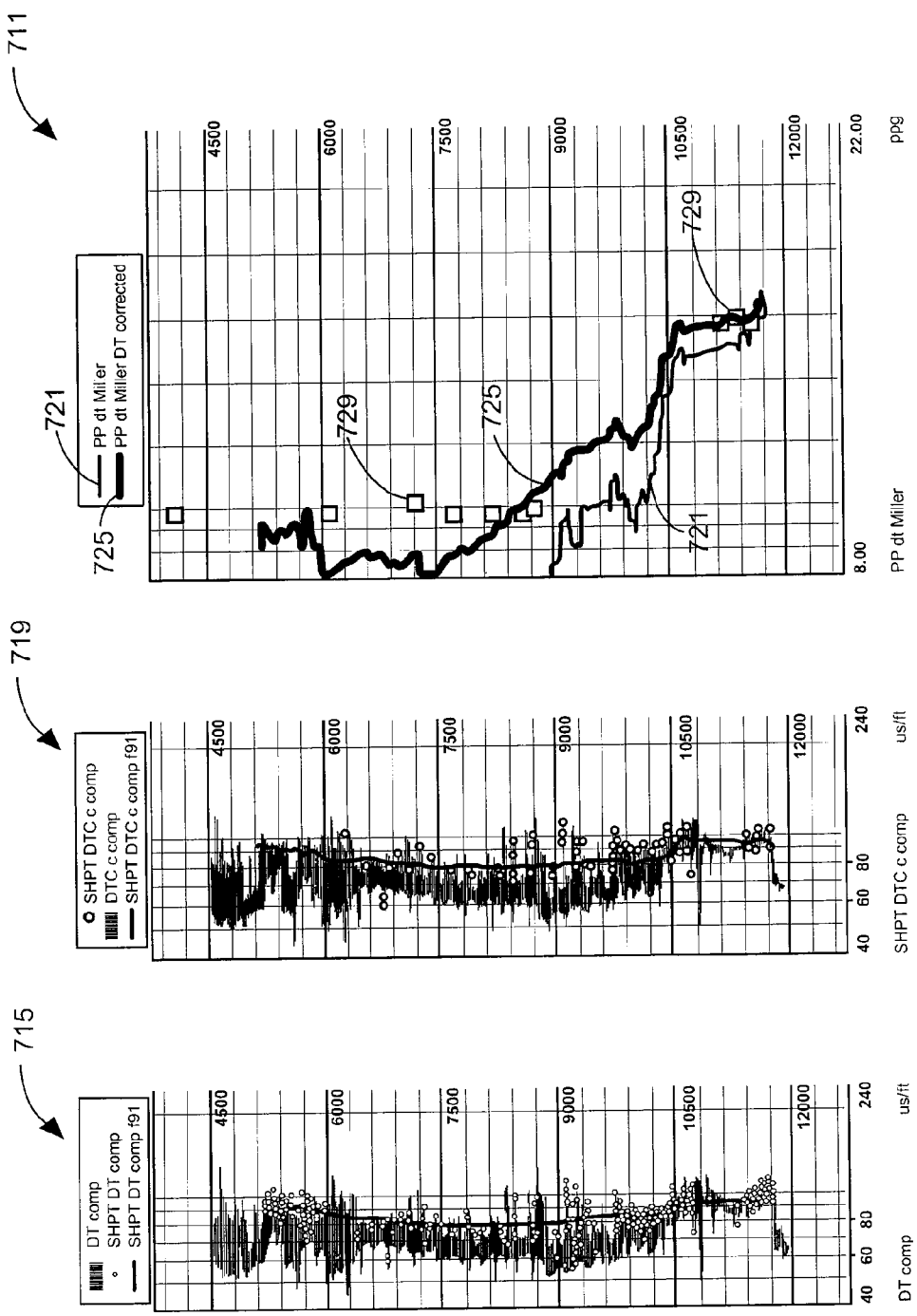
FIG. 7 includes a graph illustrating the potential benefits of compressional velocity correction, according to various embodiments of the invention.

FIG. 7 includes a graph 711 illustrating the potential benefits of compressional velocity correction, according to various embodiments of the invention. The graph 711 is used as an example to show how various embodiments may provide a more accurate pore pressure estimate than conventional mechanisms.

First, consider data indicating values of the original compressional interval travel time over depth, as shown for an actual well in graph 715. The corresponding calculated pore pressure (using the Miller method) is shown as an uncorrected, predicted pore pressure 721 in graph 711.

Second, consider data indicating values of the corrected compressional interval travel time over depth, as shown in graph 719. The corresponding calculated pore pressure (using the Miller method) is shown as a corrected, predicted pore pressure 725 in graph 711.

As can be seen in the graph 711, the magnitude of the predicted pore pressure 725 is reasonable over the shallow section of the well (e.g., from about 6400 to 8900 ft). These values also provide a good match to kicks data 729 (i.e., the square marks in the graph 711, illustrating entry of water, gas, oil, or other formation fluid into the wellbore) in the deep section of the well.

However, the predicted pore pressure 721 that is obtained from using uncorrected Vp data (or sonic compressional transit time taken directly a well log) does not give the same result. For example, the predicted pore pressure 721 in the shallow section of the well is far below the normal pore pressure of about 8.5 ppg. Indeed, the pore pressure in the shallow section should be around this normal value, or even mildly over-pressured, based on measured pressure from nearby offset wells (e.g., Bossier and Haynesville shales). Thus, the predicted pore pressure 725 comprises a superior result, when compared to the predicted pore pressure 721 that is based on uncorrected data.

In summary, the apparatus, systems, and methods disclosed herein, using offset well shear wave velocity data to provide a basis for offset well compressional wave velocity correlation, may provide increased accuracy with respect to correcting the measured compressional wave velocity in a target well—when no directly measured shear wave velocity data is available. The ability to predict pore pressure using only acquired compressional wave velocity data, when directly-measured shear wave velocity data is absent, may also be more efficient, because it can extend the scope of pore pressure analysis, particularly for unconventional plays. The mechanisms described herein can also be used to solve the technical problem of accurately predicting pore pressure in shale gas formations. As a result, the value of these services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
a housing to be operated in a first well; and
a processor to receive measured compressional wave velocity data associated with the first well, to determine corrected compressional wave velocities for the first well using a combination of the measured compressional wave velocity data and corrected compressional wave velocity data associated with one or more second wells different from the first well, the corrected compressional wave velocity data associated with the one or more second wells derived directly from measured shear wave velocity data of the respective one or more second wells, and to generate predicted pore pressure data for the first well, using the corrected compressional wave velocities.

2. The system of claim 1, further comprising:
an acoustic sensor attached to the housing to receive acoustic signals associated with the measured compressional wave velocity data.

3. The system of claim 2, further comprising:
a telemetry transmitter attached to the housing, the telemetry transmitter to communicate data associated with the acoustic signals as the measured compressional wave velocity data to a surface data processing facility.

4. The system of claim 1, wherein the housing comprises one of a wireline tool or a down hole tool.

5. The system of claim 1, wherein the processor is housed by the housing.

6. The system of claim 1, wherein the processor is housed by a surface data processing facility.

7. A processor-implemented method, to execute on one or more processors that perform the method, comprising:
measuring compressional wave velocities in a geological formation surrounding a first well, to provide measured compressional wave velocity data;
determining corrected compressional wave velocities for the first well using a combination of the measured compressional wave velocity data and corrected compressional wave velocity data associated with one or more second wells different from the first well, the corrected compressional wave velocity data associated with the one or more second wells derived directly from measured shear wave velocity data of the respective one or more second wells; and
generating predicted pore pressure data for the first well, using the corrected compressional wave velocities.

8. The method of claim 7, wherein the measuring comprises:
receiving acoustic signals in the first well from the geological formation; and
determining the measured compressional wave velocity data using the compressional wave velocities associated with the acoustic signals.

9. The method of claim 7, further comprising:
receiving original compressional wave velocity data and original shear wave velocity data associated with the one or more second wells.

10. The method of claim 9, wherein the determining comprises:
determining the corrected compressional wave velocity data associated with the one or more second wells, using the original shear wave velocity data.

11. The method of claim 9, wherein the determining comprises:
correlating the corrected compressional wave velocity data associated with the one or more second wells with the original compressional wave velocity data over a depth domain, to provide a correlation.

12. The method of claim 11, wherein the determining comprises:
determining an equation defined by the correlation, the equation describing a relationship between the measured compressional wave velocity data for the first well, and the corrected compressional wave velocities for the first well.

13. The method of claim 9, wherein the determining comprises:
determining an average slope and an average intercept of a substantially linear relationship between the corrected compressional wave velocities of the first well and the measured compressional wave velocity data for the first well, the average slope and the average intercept determined by a relationship between the original compressional wave velocity data and corrected compressional wave velocity data, based on the original shear wave velocity data, associated with multiple ones of the one or more second wells.

14. The method of claim 7, further comprising:
adjusting mud weight to balance pore pressure in the geological formation, based on the predicted pore pressure data.

15. The method of claim 7, further comprising:
storing the corrected compressional wave velocities in a table.

16. The method of claim 7, wherein the first well and the one or more second wells are all located in a same shale base formation region.

17. An article including a non-transitory machine-accessible medium having instructions stored therein, wherein the instructions, when accessed, result in a machine performing:
measuring compressional wave velocities in a geological formation surrounding a first well, to provide measured compressional wave velocity data;
determining corrected compressional wave velocities for the first well using a combination of the measured compressional wave velocity data and corrected compressional wave velocity data associated with one or more second wells different from the first well, the corrected compressional wave velocity data associated with the one or more second wells derived directly from measured shear wave velocity data of the respective one or more second wells; and
generating predicted pore pressure data for the first well, using the corrected compressional wave velocities.

18. The article of claim 17, wherein the instructions, when accessed, result in the machine performing:
transmitting the measured compressional wave velocity data to a surface computer.

19. The article of claim 17, wherein the instructions, when accessed, result in the machine performing:
publishing the predicted pore pressure data on a display.

20. The article of claim 17, wherein the instructions, when accessed, result in the machine performing:
publishing predicted seal failure or well bore failure based on the predicted pore pressure data.

* * * * *